(12) United States Patent
Hockings et al.

(10) Patent No.: US 8,572,709 B2
(45) Date of Patent: Oct. 29, 2013

(54) METHOD FOR MANAGING SHARED ACCOUNTS IN AN IDENTITY MANAGEMENT SYSTEM

(75) Inventors: Christopher John Hockings, Southport (AU); Trevor Scott Norvill, Southport (AU); Zoran Radenkovic, Robina (AU)

(73) Assignee: International Business Machines Corporation, Armonk, NY (US)

( * ) Notice: Subject to any disclaimer, the term of this patent is extended or adjusted under 35 U.S.C. 154(b) by 271 days.

(21) Appl. No.: 12/774,082

(22) Filed: May 5, 2010

(65) Prior Publication Data

US 2011/0277016 A1 Nov. 10, 2011

(51) Int. Cl.
| | |
|---|---|
| *G06F 7/04* | (2006.01) |
| *G06F 15/16* | (2006.01) |
| *G06F 17/30* | (2006.01) |
| *G06F 12/00* | (2006.01) |
| *G06F 12/14* | (2006.01) |
| *G06F 13/00* | (2006.01) |
| *H04L 29/06* | (2006.01) |
| *G11C 7/00* | (2006.01) |

(52) U.S. Cl.
USPC ........... 726/8; 726/4; 726/18; 726/19; 726/21

(58) Field of Classification Search
USPC .................................................. 726/4–5, 8
See application file for complete search history.

(56) References Cited

U.S. PATENT DOCUMENTS

| | | | | |
|---|---|---|---|---|
| 5,768,519 | A * | 6/1998 | Swift et al. ..................... 709/223 |
| 6,202,066 | B1 * | 3/2001 | Barkley et al. ................. 707/785 |
| 6,510,523 | B1 * | 1/2003 | Perlman et al. ................... 726/6 |
| 6,601,171 | B1 * | 7/2003 | Carter et al. ................... 713/175 |
| 7,020,705 | B2 * | 3/2006 | Wang et al. .................... 709/229 |
| 7,039,812 | B2 * | 5/2006 | Kawan et al. .................. 713/186 |
| 7,047,560 | B2 * | 5/2006 | Fishman et al. ................... 726/6 |
| 7,254,831 | B2 * | 8/2007 | Saunders et al. .................. 726/8 |
| 7,380,271 | B2 * | 5/2008 | Moran et al. ...................... 726/4 |
| 7,392,387 | B2 * | 6/2008 | Balfanz et al. ................. 713/168 |
| 7,487,130 | B2 | 2/2009 | Steele et al. |
| 7,690,036 | B2 * | 3/2010 | Fitzgerald et al. .............. 726/22 |
| 7,738,808 | B2 * | 6/2010 | Lovat et al. ..................... 399/79 |
| 7,873,553 | B2 * | 1/2011 | Zhang et al. .................... 705/34 |

(Continued)

OTHER PUBLICATIONS

Straub et al, "A Multipurpose Delegation Proxy for WWW Credentials," Public Key Infrastructure, Second European PKI Workshop: Research and Applications, EuroPKI 2005, Jun. 30-Jul. 1, 2005.

(Continued)

*Primary Examiner* — Carolyn B Kosowski
(74) *Attorney, Agent, or Firm* — Jeffrey S. LaBaw; David H. Judson (57) ABSTRACT

This disclosure describes a method of and system for provisioning of shared account credentials to provide authorized access to shared or delegated accounts. Preferably, an enterprise single sign-on (E-SSO) system is used to manage the shared account or control delegation of account access, and preferably the shared or delegated account credential is not exposed to the end user. The described technique enables temporary delegation of account privileges to a member of a shared role. Using the described approach, an information technology (IT) account may be shared so that a user who needs to perform a shared duty can do so in the context of a shared role and without having control over the account itself. The approach facilitates delegating the use of a single account to one of a member of the shared role.

20 Claims, 5 Drawing Sheets

(56) References Cited

U.S. PATENT DOCUMENTS

| | | | |
|---|---|---|---|
| 7,886,048 B1* | 2/2011 | Holland et al. | 709/224 |
| 7,890,998 B2* | 2/2011 | Lu et al. | 726/21 |
| 7,900,252 B2* | 3/2011 | Kawano et al. | 726/18 |
| 7,920,549 B2* | 4/2011 | Alt et al. | 370/352 |
| 7,958,368 B2* | 6/2011 | Dewey et al. | 713/183 |
| 8,332,917 B2* | 12/2012 | Forster et al. | 726/5 |
| 2001/0013096 A1* | 8/2001 | Luckenbaugh et al. | 713/154 |
| 2002/0026592 A1* | 2/2002 | Gavrila et al. | 713/201 |
| 2002/0083014 A1* | 6/2002 | Brickell et al. | 705/76 |
| 2002/0144149 A1* | 10/2002 | Hanna et al. | 713/201 |
| 2003/0088786 A1* | 5/2003 | Moran et al. | 713/201 |
| 2004/0054933 A1* | 3/2004 | Wong et al. | 713/202 |
| 2005/0044423 A1* | 2/2005 | Mellmer et al. | 713/201 |
| 2007/0245013 A1* | 10/2007 | Saraswathy et al. | 709/223 |
| 2008/0052777 A1 | 2/2008 | Kawano et al. | |
| 2008/0184349 A1* | 7/2008 | Ting | 726/7 |
| 2009/0106828 A1* | 4/2009 | Doui | 726/7 |
| 2009/0158425 A1 | 6/2009 | Chan et al. | |
| 2009/0172795 A1 | 7/2009 | Ritari et al. | |
| 2009/0199277 A1* | 8/2009 | Norman et al. | 726/5 |
| 2009/0217367 A1* | 8/2009 | Norman et al. | 726/8 |
| 2010/0082989 A1* | 4/2010 | Bussard et al. | 713/176 |
| 2010/0154040 A1* | 6/2010 | CHiu | 726/5 |
| 2010/0212002 A1* | 8/2010 | Michener et al. | 726/7 |
| 2011/0023107 A1* | 1/2011 | Chen et al. | 726/12 |
| 2011/0225426 A1* | 9/2011 | Agarwal et al. | 713/175 |
| 2011/0247059 A1* | 10/2011 | Anderson et al. | 726/6 |
| 2011/0277016 A1* | 11/2011 | Hockings et al. | 726/4 |
| 2012/0092708 A1* | 4/2012 | Hayami | 358/1.15 |
| 2012/0131343 A1* | 5/2012 | Choi et al. | 713/168 |
| 2012/0180112 A1* | 7/2012 | Chen et al. | 726/4 |

OTHER PUBLICATIONS

Christianson et al, "Auditable Anonymous Delegation," Information Systems Security, First International Conference, ICISS 2005, Lecture Notes in Computer Science, vol. 3803, pp. 66-75, 2005.

* cited by examiner

METHOD FOR MANAGING SHARED ACCOUNTS IN AN IDENTITY MANAGEMENT SYSTEM

BACKGROUND OF THE INVENTION

1. Technical Field

This disclosure relates generally to identity management in a distributed computing environment.

2. Background of the Related Art

A shared (or "sharing") account is an Information Technology (IT) login credential shared among a group of users. Typically, a shared account is in limited supply or is used as a common credential to which a group of people require access (such as a helpdesk). Access to the shared account is via a common credential shared among a set of users that have authorized access to the shared account. Provisioning and revocation of the shared credential often proves to be a manual, costly and problematic endeavor. This is largely because the shared account credential is distributed to all authorized shared account users in clear text. This makes auditing of the shared account particularly difficult, as many users have access to the account, and there is no easy way of tracking which user performs which action with respect to the account. In addition, there is a risk that a given user will distribute the shared account information to unauthorized users. Moreover, to revoke access for a particular user, the account credentials must be changed on the shared account as a whole, and then a new account credential re-distributed to all authorized share account users.

An additional problem concerns account delegation, where it is required that user delegates the use of an account to another, typically for a period of time. A typical use scenario is when a user must take a leave of absence, in which case account delegation allows a user to delegate a single account to one of a group of authorized users. Current identity management solutions do not allow for delegation of a single account to another person, but rather only allow for delegation of identity-related operations (e.g., workflow approvals).

Current identity management systems can facilitate the provisioning of shared account credentials. In both the shared account and delegated account cases, however, a significant drawback to such systems is that all shared account users have access to a clear text password. Additionally, the shared account users themselves typically have authorization to modify this password. In the case of shared accounts, this can result in revocation of access for other authorized users.

BRIEF SUMMARY

A method is operative within an identity management solution to allow a group of users authorized access to a shared account. In an illustrative embodiment, the identity management solution comprises an identity manager for provisioning and management of single sign-on (SSO) user accounts on an associated enterprise single sign-on (E-SSO) server. The method begins by designating, in the identity manager, a "shared" role to represent an entitlement to a shared account. Using the identity manager, a new user is then authorized to access the shared account, preferably by assigning the role to the user. Then, in response to a change by an account owner of a password for the shared account, the identity manager automatically generates and distributes to the E-SSO server user accounts, including the E-SSO account associated with the new user, a shared account credential. The shared account credential is then used to permit access to the shared account. Because this credential is managed via the E-SSO system, it is not exposed to any shared account user. The owner of the shared account preferably maintains responsibility for the account itself and may be responsible for approving who has access to the account. Shared account members, however, are not permitted to change the password to the account itself. This guarantees that a shared account user neither has the ability to view the password or the ability to change it.

The user's authorized access to the shared account can be removed by de-associating the role from the user in the identity manager. In addition, the shared account can be delegated for use by a single authorized user by associating a delegated role with the shared role and then having the identity manager generate and distribute to the E-SSO server a unique randomly-generated delegated account credential. Only the single user authorized to access the delegated account possesses the delegated account credential.

The foregoing has outlined some of the more pertinent features of the invention. These features should be construed to be merely illustrative. Many other beneficial results can be attained by applying the disclosed invention in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF AN ILLUSTRATIVE EMBODIMENT

Figure 1:
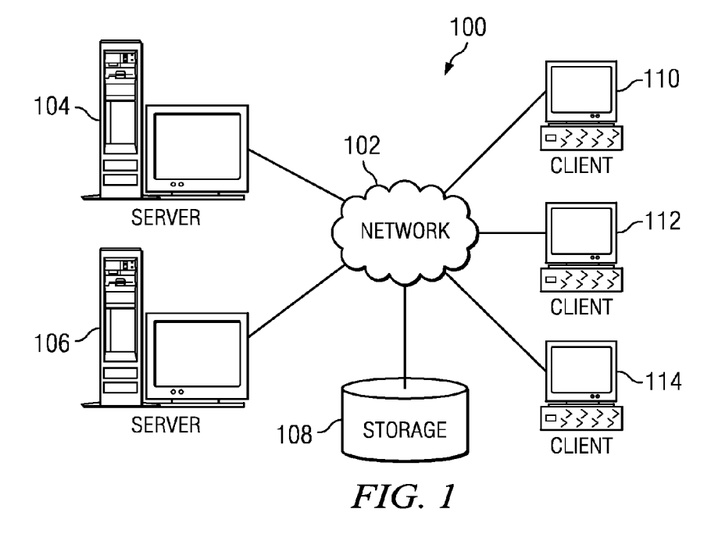
FIG. 1 depicts an exemplary block diagram of a distributed data processing environment in which exemplary aspects of the illustrative embodiments may be implemented.
Figure 2:
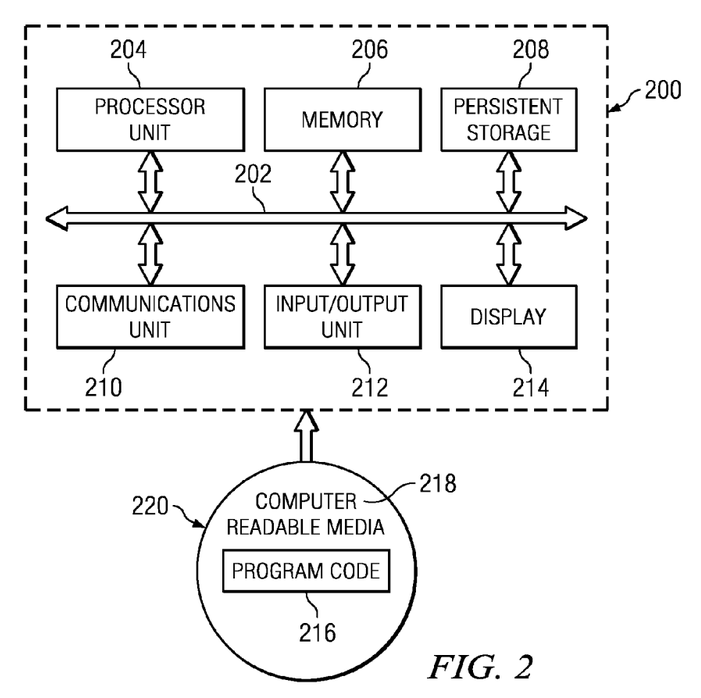
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As is known in the art, a "shared account" is a resource used by a group of people for a common purpose, such as a shared email account or a common helpdesk account used by helpdesk staff. These are merely representative examples of a shared account. This disclosure describes how a known identity management solution, which comprises an identity manager and a distinct enterprise single sign-on (E-SSO)) mechanism, can be configured (or extended) to manage access to a shared account for a group of authorized users. As will be seen, the approach uses a "role" (e.g., a "share account" role) to represent the group of users that are authorized to access the shared account. Access to the shared account for a particular user is then authorized by adding a user to the share account role. The identity manager is configured to provision the shared account credential to the E-SSO account of authorized users.

When a user is added to a shared role, that user is authorized to access the associated shared account. Preferably, the association between the shared account and the role is stored in E-SSO service definition. The identity manager is configured to send an email (or other notification) to the shared account owner when a shared role is updated. This notification informs the shared account owner that he or she needs to change the shared account password. This is necessary because the shared account owner requires control of the shared account password. The identity manager is configured to distribute the shared account credential to authorized shared account users when a change password is performed on the shared account. This is a form of "zero touch" provisioning, because the end user does not need to know the user identifier or password for the new accounts if he or she is using enterprise single sign-on.

When the shared account owner changes their identity manager account password, the password is updated and distributed to access manager E-SSO accounts for all authorized shared account users.

Figure 3:
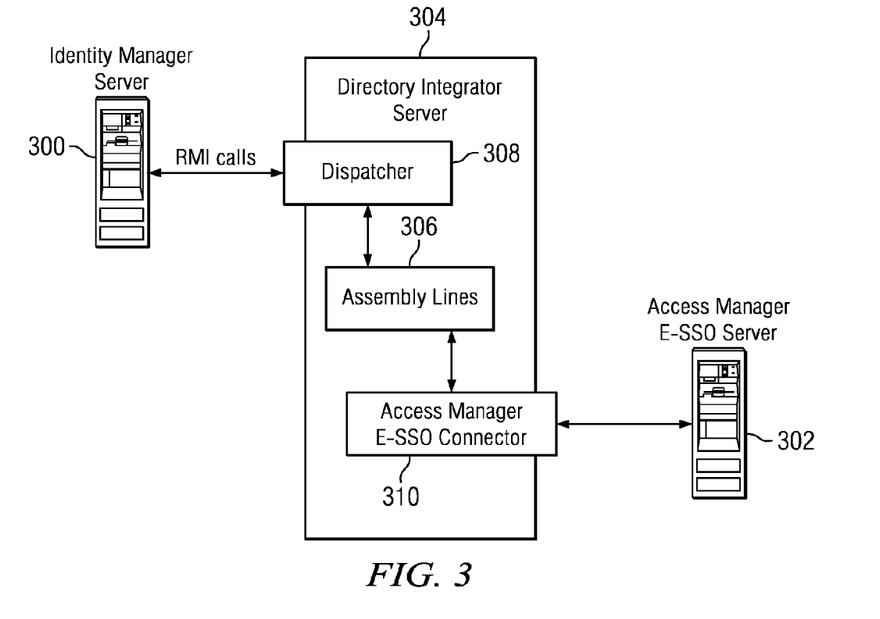
FIG. 3 is a block diagram of high level components of an identity and access management solution in which the disclosed subject matter may be implemented.

Thus, according to one embodiment, conventional identity management tools and/or systems are adapted or extended to implement the techniques described herein. FIG. 3 illustrates a known identity and access management solution in which the subject matter of this disclosure may be implemented. This solution comprises identity manager server (IMS) 300, access manager enterprise single sign-on (E-SSO) server 302, and a directory integrator server 304. The identity manager server 300 may be IBM® Tivoli® Identity Manager, the access manager E-SSO server 302 may be IBM® Tivoli® Access Manager E-SSO Server, and the directory integrator server 304 may be IBM® Tivoli® Directory Integrator Server, although these are merely representative. The E-SSO server typically includes an adapter, which is a program that provides an interface between a managed resource and the identity manager server 300. Adapters may or may not reside on the managed resource, and the identity manager server 300 manages access to the resource, typically using a security system. The access manager E-SSO adapter uses the directory integrator server 304 to facilitate communication between the identity manager server 300 and the access manager E-SSO server 302. The E-SSO adapter functions as a trusted virtual administrator on the target platform, performing such tasks as creating user IDs, deleting IDs, and managing user account credentials. The access manager E-SSO adapter can be used to automate certain administrative tasks with respect to the E-SSO identity manager server, such as creating new users, deleting user accounts, changing user accounts passwords, and reconciling users and user attributes.

The identity manager 300 communicates with the access manager E-SSO to administer access manager E-SSO user accounts. The following actions may be performed on an account: add, modify, change password, delete and search. As illustrated in FIG. 3, the access manager E-SSO adapter typically comprises one or more directory integrator server assembly lines 306, a dispatcher 308, and an access manager E-SSO connector 310. When an initial request is made by the identity manager server to the access manager E-SSO adapter, the assembly lines 306 are loaded into the directory integrator server. As a result, subsequent service requests do not require those same assembly lines to be reloaded. The assembly lines 306 use directory integrator components to undertake user management-related tasks on the access manager E-SSO identity management server 302. As illustrated, the identity manager server 300 makes remote method invocation (RMI) calls, and communications to the E-SSO server 302 are carried out via the E-SSO connector 310 preferably using SOAP over SSL. The various components preferably are implemented as Java™ objects.

Generally, the identity manager server 300 provides identity lifecycle management for application users, and the access manager E-SSO server 302 provides real-time implementation of access security policies for users and applications. The identity manager server is integrated with the access manager E-SSO server to make it possible for users created in the identity manager to be automatically provisioned in the access manager E-SSO server. An application account that is provisioned using the identity manager server automatically populates a corresponding users' access manager E-SSO data structure, sometimes referred to as a "wallet." According to this disclosure, the E-SSO adapter is extended to support sharing the access of the same account credentials between multiple people who have an access manager E-SSO account wallet. The right to share this account is defined by membership in a particular identity manager role. Because the account credentials are shared by more than one person at the same time, there is no individual accountability for it. Typically, this solution is used for specific share account solutions (e.g., a helpdesk), where individual accountability is not required.

Preferably, every shared account has an associated identity manager role. The role owner must be the same person that owns this shared account. When a user is added to an identity manager role, a person modify workflow operation is initiated for that user. This is used to notify a group shared account owner that the password for the group shared account must be updated. When the owner changes the password for this shared account, it triggers a shared account change password operation that has already been configured to provision the shared account to the access manager E-SSO account for authorized users.

Figure 4:
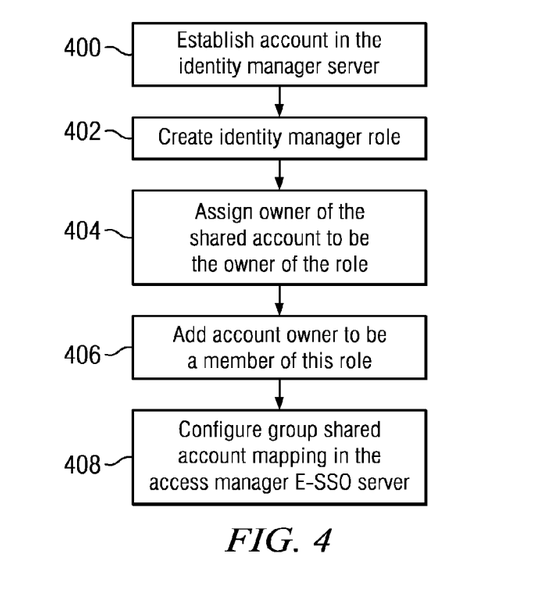
FIG. 4 is a process flow diagram illustrating how a shared account is set up according to the teachings of this disclosure.

A group shared account is set up as follows and as illustrated in the process flow diagram in FIG. 4. To share access to an account among group members, the account is established in the identity manager server 300. This is step 400. At step 402, an identity manager role is created for the purpose of granting account access permission to other users. This identity manager role is created using the identity manager server 300. At step 404, the owner of the shared account is assigned to be the owner of the role. Only one owner is allowed per role. At step 406, the account owner is added to be a member of this role. At step 408, a group shared accounts mapping is configured in the access manager E-SSO server 302. This operation defines the name of the service to which the shared account belong, the user ID of the shared account, and the name of the role that is associated with this shared account.

Figure 5:
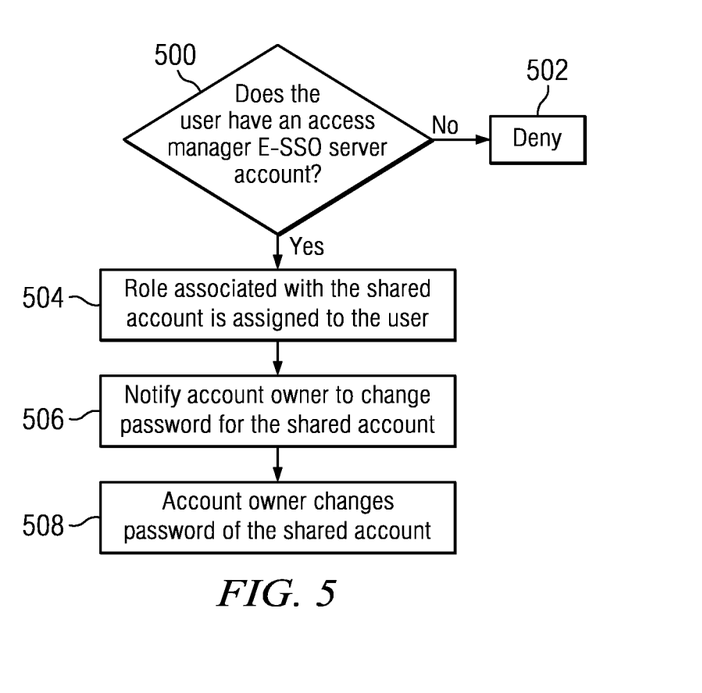
FIG. 5 is a process flow diagram illustrating how an account owner grants access to the shared account.

FIG. 5 is a process flow illustrating how to grant access to the shared account. At step 500, a test is performed to ensure that the user (in identity manager server 300) to be granted access has an access manager E-SSO server account. If not, access is denied at step 502. If the user has an E-SSO server account, a role that is associated with a shared account is assigned to the user. This is step 504. The shared account owner is then notified at step 506 to change the password of the shared account. At step 508, the shared account owner changes the password of the shared account, e.g., via the identity manager server 300. The shared account is now in this user's access manager E-SSO account wallet.

Figure 6:
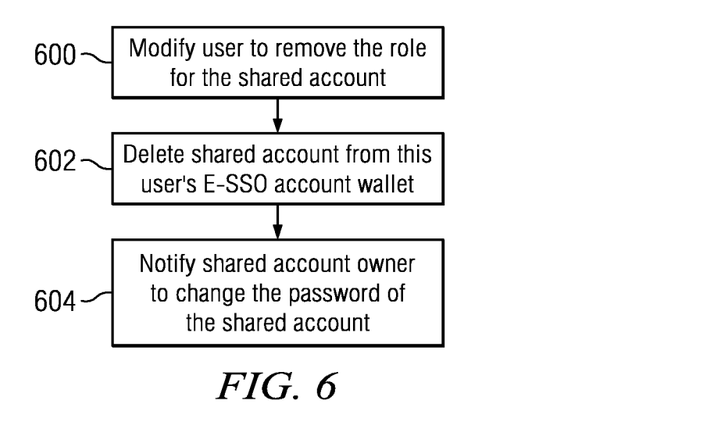
FIG. 6 is a process flow diagram illustrating how an account owner removes a user's access to the shared account.

FIG. 6 is a process flow illustrating how to remove access to the shared account. At step 600, the user is modified (in the identity manager server 300) to remove the role for the shared account. At step 602, the shared account is deleted from this user's access manager E-SSO account wallet. At step 604, a notification is then made to notify the shared account owner to change the password of the shared account.

The techniques described above facilitate provisioning of shared account credentials to provide authorized access to shared or delegated accounts. Preferably, and as described and illustrated above, an enterprise single sign-on (E-SSO) system is used to manage the shared account or control delegation of account access, and preferably the shared or delegated account credential is not exposed to the end user. The described technique enables temporary delegation of account privileges to a member of a shared role. Using the described approach, an information technology (IT) account may be shared so that a user who needs to perform a shared duty can do so in the context of a "shared role" and without having control over the account itself. The approach facilitates delegating the use of a single account to one of a member of the shared role.

Figure 7:
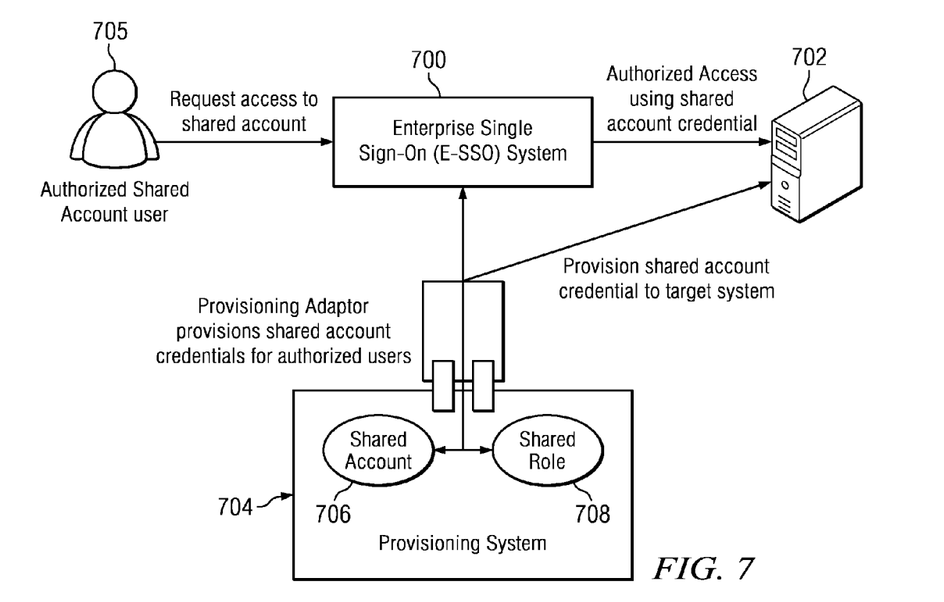
FIG. 7 is a block diagram showing additional details of how shared account credentials are provisioned to an enterprise single sign-on (E-SSO) system to authorize access to a shared account.

FIG. 7 illustrates in more detail the provisioning of a shared account credential to an SSO-enabled system 700 to authorize access to an account. In this embodiment, an authorized shared account user 705 desires to access a resource in a target system 702. A provisioning system 704, such as may be created by the identity manager server in FIG. 3, includes a provisioning adapter 701 that provisions the shared account credentials for authorized users. This provisioning adapter 701 was described above with reference to FIG. 3, and it may be implemented as an E-SSO adapter, or in any other convenient manner. The provisioning system 704 in the identity management system is used to represent an entitlement to a shared account. As noted above, a role is used to authorize access to the shared account. To authorize access to the shared account, a user, such as user 705, is added to a role designated as a shared role 708. The identity management system provisions a credential for the shared account to the single sign-on (SSO) system 700 for the authorized user 705. The authorized end user 705 can then login to the SSO-enabled system 700 and access a required resource in the target system 702. Preferably, the shared account credential is stored in the SSO system 700 in an encrypted form so that the end user does not have access to any clear text password of the shared account. Access to the shared account 704 is revoked by removing the user from the shared account role 708. This removes the shared account credential from the E-SSO system for the user (and, in particular, from the user's E-SSO account wallet). As the shared account credential preferably is also provisioned to a target resource 702, users that have been revoked by the E-SSO system no longer have a valid SSO credential with respect to that resource.

Figure 8:
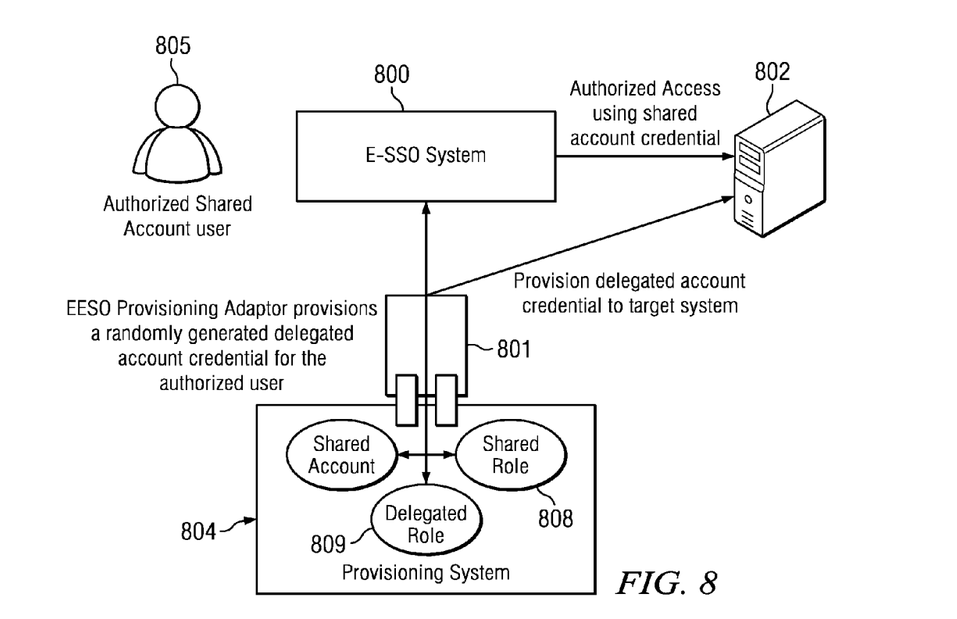
FIG. 8 is a block diagram showing delegated account provisioning according to another aspect of this disclosure.

FIG. 8 illustrates delegated account provisioning according to a second aspect of this disclosure. In this embodiment it is desired to provision a delegated account credential to the target system. Delegation of a particular account requires that only a single user be able to use that account at one time. This guarantees that audit data can prove who was using the system on behalf of the owner at any given point in time. In this embodiment, the identity management system restricts authorized access to a delegated account by managing membership to a so-called delegated role 809 that is linked with the shared role 808. Membership of this delegated role 809 is achieved through membership of the shared role 808. For a delegated account, role membership is enforced by the provisioning system 804 to just a single user. Upon a role change to the delegated role 809, preferably a unique randomly-generated delegated account credential is created and provisioned to both the E-SSO system 800 and the target system 802 account. Preferably, the delegated account owner is one of a list of users that are associated with the shared account role, although this is not a requirement. This delegated account owner receives access to the account typically in a "push" manner, although this also is not a limitation. In any event, the approach ensures that only the user 805 authorized to access the delegated account possesses the correct credential. In the preferred embodiment, the credential is the password only, and not the username.

Figure 9:
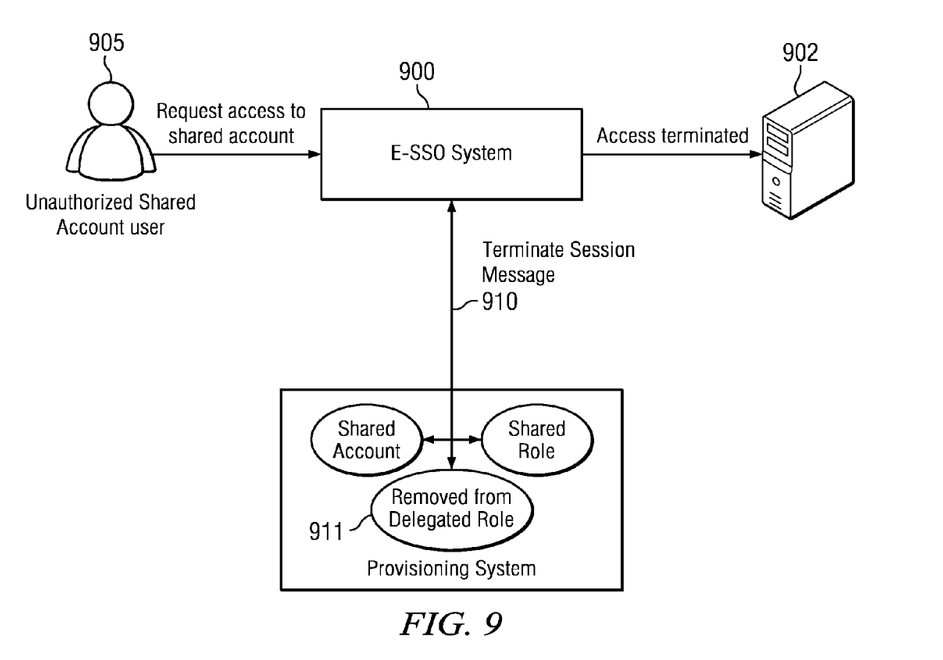
FIG. 9 is a block diagram illustrating how a session is terminated when an unauthorized shared account user requests access to the shared account.

FIG. 9 illustrates how to terminate a session when the user is removed from the delegated role that was created in FIG. 8. In particular, an additional mechanism is required to guarantee sessions on the target system 902 are terminated, e.g., as required by a given security policy. To that end, upon removal from the delegated role, as indicated by reference numeral 911, a terminate session manage 910 is sent to the E-SSO system 900 to revoke access to the target system 900. The shared account user 905 is now unauthorized. This action may then force the closing of any sessions that use the delegated account for login. Typically, the method for removing a delegated account session is different for each application; thus, preferably the E-SSO system provides a mechanism for defining this method (e.g., typing exit on a Putty session, closing a window, sending a command to a server to delete the session, and so forth).

Figure 10:
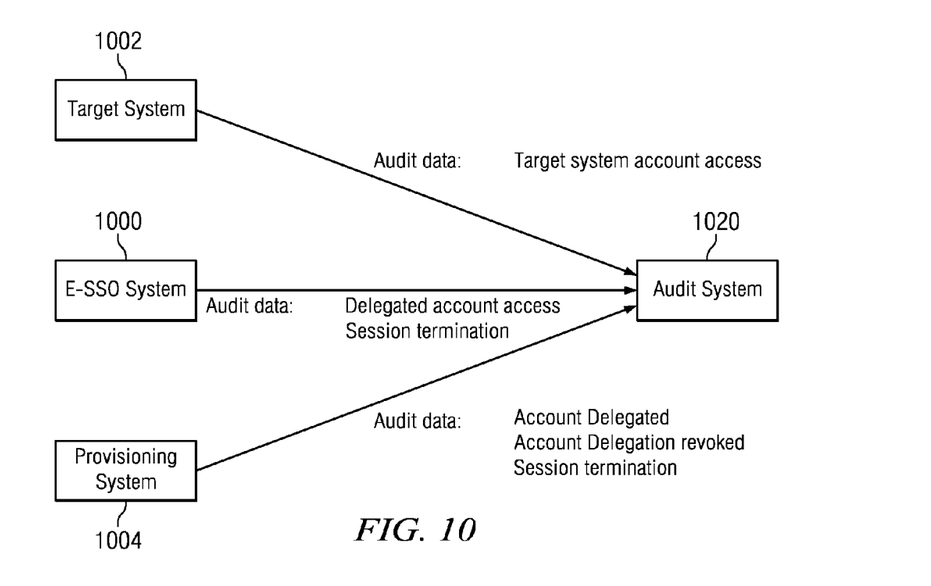
FIG. 10 is a block diagram illustrating a representative audit system for delegated accounts according to this disclosure.

FIG. 10 illustrates an audit system 1020 for delegated accounts according to another aspect of this disclosure. The accountability of the delegated account preferably rests with the account owner, but with these processes in place the owner is assured that when an account is delegated, only a single user possesses the credential to access the system. Audit solutions, such as Tivoli Compliance Insight Manager, provide a mechanism to report this, e.g., based on audit records generated by the systems. Access to the delegated account using system audit data is illustrated. Preferably, an audit record is created when a user is delegated the account via the provisioning system 1004, when a user accesses the target system 1002 via the E-SSO system 1000 (preferably both the identity authenticated at the client system and the shared system is audited), when a user cancels a delegation of the account via the provisioning system 1004, and when a user session is terminated via the identity management system.

The following describes an example of how to configure a shared account role and assign a given user to that role. Typically, this operation is performed using a graphical user interface, such as an identity manager (IM) administration console, although any command line or programmatic interface may be used as well. A representative interface exports for viewing one or more display menus, fill-in forms, and the like. The administrator opens a display panel (e.g., "Manage Roles"), selects "Create" and defines a new role, such as "HelpDeskRole." A description (e.g., "a role to authorize users to receive the credential for the associated shared account") also may be added. This completes the configuration of the shared account role. The owner selects "Next" and then "Add," after which a new user (e.g., "John Smith") is input to (i.e. defined for) the shared role. The owner then selects "Finish" to complete the process.

When a user is added to a role, a person modify workflow operation is initiated for that user. The workflow operation notifies the shared account owner that he or she needs to update the shared account password. Thus, when user John Smith is added to a shared role (e.g., HelpDeskRole), that user is authorized to access the associated shared account. As noted above, when a new user is added to the role, the identity manager sends an email to the shared account owner. This is necessary because the shared account owner requires control of the shared account password. When the shared account owner changes the shared account password, it triggers a shared account change password operation to distribute the new shared account credential to the access manager E-SSO account of authorized users. The generation of the password may be automated and then e-mailed (or otherwise communicated in any convenient manner) to the role owner.

Generalizing, when a person is added to a shared role, a notification is sent to the shared account owner asking them to change their shared account password. When the shared account owner changes the shared account password, the password is updated and distributed to access manager E-SSO accounts for all authorized shared account users.

One of ordinary skill in the art will recognize that this disclosure provides a system for managing both shared accounts and the ability to delegate an account in an environment using identity access management (IAM) and single sign-on (SSO) technologies.

The disclosed subject matter provides numerous advantages. The techniques disclosed herein ensure that there is an identified account owner who has full control over the account. Then, a chain of command approach may be used to make assertions about who has been granted authorized access to the account, and further interrogation can be performed on individual systems or components if the account has been misused. With the described approach, preferably the account password is never communicated in the clear, but this password is known at all times by the account owner. Further, the described approach may be implemented in an automated manner such that no manual processes are required. The system provides a mechanism for non-privileged accounts to be managed within an acceptable security control level, befitting the type of account being managed. Moreover, the approach can be readily extended to manage special assigned privileged duties to one of a possible set of users, thereby providing a high availability solution for critical duties associated with a given system.

In the prior art, it was not possible to associate or define a single owner for a shared account, and such accounts typically were ignored during auditing. The present invention addresses this deficiency. Using the described approach, an account can be shared among a group of users, and a provisioning system operates automatically to provision share account credentials to shared account users without the credentials themselves being visible to the share account users. This approach is flexible in that it enables management of shared accounts that are normally non-privileged in nature. The approach has the further advantage in that it can be used to delegate operational duties associated with a single account to another user, and delegated account use can be reliably monitored and audited.

The block diagrams in the different depicted embodiments illustrate the architecture, functionality, and operation of some possible implementations of apparatus, methods and computer program products. In this regard, each block in the flowchart or block diagrams may represent a module, segment, or portion of code, which comprises one or more executable instructions for implementing the specified function or functions. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

The disclosed subject matter can take the form of an entirely hardware embodiment, an entirely software embodiment or an embodiment containing both hardware and software elements. In a preferred embodiment, the invention is implemented in software, which includes but is not limited to firmware, resident software, microcode, etc.

The disclosed subject matter can take the form of a computer program product accessible from a computer-usable or computer-readable medium providing program code for use by or in connection with a computer or any instruction execution system. For the purposes of this description, a computer-usable or computer readable medium can be any tangible apparatus that can contain or store the program for use by or in connection with the instruction execution system, apparatus, or device.

The medium is tangible, and it can be an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the disclosed subject matter has been presented for purposes of illustration and description, and is not intended to be exhaustive or limited to the invention in the form disclosed. Many modifications and variations will be apparent to those of ordinary skill in the art. The embodiment was chosen and described to best explain the principles of the invention, the practical application, and to enable others of ordinary skill in the art to understand the invention for various embodiments with various modifications as are suited to the particular use contemplated.

As noted, the techniques described herein may be implemented in or in conjunction with various server-side architectures including simple n-tier architectures, web portals, federated systems, and the like.

The techniques herein are not limited for use with "shared" accounts of any distinct type, format or structure. Thus, the techniques disclosed herein may also be extended to other accounts, account types or account formats, one such example being a "privileged" or "root" account within a data processing system.

A shared account management mechanism that implements the disclosed techniques may be implemented as a service, or as a standalone machine or set of machines, such as described above.

While the techniques have been described in the context of mapping a single account to a role, one of ordinary skill in the art will appreciate that the disclosed techniques may be extended to cover multiple accounts-to-role mappings.

The techniques herein have been described in the context of an identity management server that communicates with an intermediary to populate and manage credentials in the user's access manager E-SSO account. As noted above, the E-SSO adapter provides for a shared account workflow extension to add, modify and delete account credentials to users' wallets, although other types of workflows may be used for this purpose. Also, the techniques disclosed herein may be integrated to the identity manager or the E-SSO server as desired to obviate the intermediary or the use of an adapter.

Having described our invention, what we now claim is as follows.

The invention claimed is:

1. A method to allow a group of users authorized access to a shared account, wherein a shared account is an account that has an associated account credential that is adapted to be shared concurrently among users authorized to have access to the account, comprising:
designating a role in an identity management system to represent an entitlement to a shared account;
authorizing access to the shared account for a user by assigning the role to the user, the user also having an associated single sign-on (SSO) account; and
in response to a change by an account owner of a password for the shared account, automatically distributing a shared account credential to the user's single sign-on account to enable the user to access the shared account.

2. The method as described in claim 1 wherein the shared account credential is also distributed to the SSO account to of one or more other users authorized to access the shared account.

3. The method as described in claim 1 further including assigning the account owner to be an owner of the role.

4. The method as described in claim 2 further including adding the account owner to be a member of the role.

5. The method as described in claim 1 further including, at a later time, removing the user's access to the shared account.

6. The method as described in claim 5 wherein the step of removing the user's access to the shared account comprises de-associating the user from the role.

7. The method as described in claim 6 further including notifying the account owner to change the password for the shared account following the step of de-associating the user from the role.

8. The method as described in claim 1 further including:
associating a delegated role with the role;
generating a unique delegated account credential; and
provisioning the unique delegated account credential to a single user's SSO account to restrict access to the shared account except by the single user.

9. The method as described in claim 8 further including collecting audit data associated with the single user's use of the shared account.

10. An identity management apparatus, comprising:
a processor; and
computer memory holding computer instructions that, when executed by the processor, perform a method comprising:
designating a role to represent an entitlement to a shared account, wherein a shared account is an account that has an associated account credential that is adapted to be shared concurrently among all users authorized to have access to the account;
authorizing access to the shared account for a new user by assigning the role to the new user; and in response to a change by an account owner of a password for the shared account, automatically generating and distributing to a single sign-on (SSO) system a shared account credential, the shared account credential adapted to be stored in the single sign-on system to enable the group of users, including the new user, to access the shared account without exposing the shared account credential to the group users.

11. The identity management apparatus as described in claim 10 wherein the method further includes later removing the new user's access to the shared account by de-associating the new user from the role.

12. The identity management apparatus as described in claim 11 wherein the method further includes notifying the account owner to change the password for the shared account following the step of de-associating the new user from the role.

13. The identity management apparatus as described in claim 10 wherein the method further includes:
associating a delegated role with the role;
generating a unique delegated account credential; and
provisioning the unique delegated account credential to a single user's SSO account to restrict access to the shared account except by the single user.

14. A computer program product in a non-transitory computer readable medium for use in a data processing system, the computer program product holding computer program instructions which, when executed by the data processing system perform a method, comprising:
designating a role to represent an entitlement to a shared account, wherein a shared account is an account that has an associated account credential that is adapted to be shared concurrently among all users authorized to have access to the account;
authorizing access to the shared account for a new user by assigning the role to the new user; and
in response to a change by an account owner of a password for the shared account, automatically generating and distributing to a single sign-on (SSO) system a shared account credential, the shared account credential adapted to be stored in the single sign-on system to enable the group of users, including the new user, to access the shared account without exposing the shared account credential to the group users.

15. The computer program product as described in claim 14 wherein the method further includes later removing the new user's access to the shared account by de-associating the new user from the role.

16. The computer program product as described in claim 15 wherein the method further includes notifying the account owner to change the password for the shared account following the step of de-associating the new user from the role.

17. The computer program product as described in claim 14 wherein the method further includes:
associating a delegated role with the role;
generating a unique delegated account credential; and
provisioning the unique delegated account credential to a single user's SSO account to restrict access to the shared account except by the single user.

18. The computer program product as described in claim 14, wherein the computer program instructions are stored in the computer readable medium in the data processing system, wherein the computer program instructions were downloaded over a network from a remote data processing system.

19. The computer program product as described in claim 14, wherein the computer program instructions are stored in the computer readable medium in the data processing system, wherein the computer program instructions are downloaded over a network to a remote data processing system for use in a computer readable medium with the remote system.

20. An identity management system, comprising:
an enterprise single sign-on (E-SSO) server;
an identity manager server that administers E-SSO user accounts on the E-SSO server, the identity manager server including an interface through which (i) a shared role is designated to represent an entitlement to a shared account and (ii) the shared role is assigned to a user, wherein a shared account is an account that has an associated account credential that is adapted to be shared concurrently among all users authorized to have access to the account; and
an adapter associated with the E-SSO server that responds to a change by an account owner of a password for the shared account to automatically generate and distribute to the E-SSO user accounts on the E-SSO server a shared account credential.

* * * * *